United States Patent [19]

Alford et al.

[11] Patent Number: 5,248,464
[45] Date of Patent: Sep. 28, 1993

[54] ARTICLE OF CERAMIC MATERIAL AND PRODUCTION THEREOF

[75] Inventors: Neil M. Alford, Upton-By-Chester; James D. Birchall, Mouldsworth; Kevin Kendall, Runcorn, all of England

[73] Assignee: Imperial Chemical Industries PLC, London, England

[21] Appl. No.: 885,016

[22] Filed: May 19, 1992

Related U.S. Application Data

[63] Continuation of Ser. No. 622,166, Dec. 3, 1990, abandoned, which is a continuation of Ser. No. 185,872, Apr. 25, 1988, abandoned.

[30] Foreign Application Priority Data

Apr. 23, 1987 [GB] United Kingdom ............... 8709598

[51] Int. Cl.$^5$ .......................................... C04B 35/64
[52] U.S. Cl. .................................. 264/63; 264/211.1; 419/3; 505/739
[58] Field of Search ................ 263/63, 211.11; 419/3; 505/739

[56] References Cited

U.S. PATENT DOCUMENTS 3,853,688 12/1974 D'Ambrosio ................ 264/211.11
4,364,877 12/1982 Clement et al. .
4,551,295 11/1985 Gardner et al. .
4,725,391 2/1988 Bardhan et al. .

FOREIGN PATENT DOCUMENTS 0190668 1/1986 European Pat. Off. .
0183453 6/1986 European Pat. Off. .

OTHER PUBLICATIONS

Word Ceramics, International Ceramics and Refractories Manual 1985, vol. 12, Edition 85, pp. 78-79.
Hot Isostatic Press, Kobe Steel, No. 428090, pp. 1-6.

*Primary Examiner*—James Derrington
*Attorney, Agent, or Firm*—Cushman, Darby & Cushman

[57] ABSTRACT

A process for the production of a shaped article of a ceramic material in which a composition comprising particulate ceramic material and a liquid medium is shaped, the liquid medium is removed from the shaped composition, and the composition is heated to sinter the particles of ceramic material in which the composition is subjected to high shear mixing such that in the shaped article which is produced the mean maximum size of flaw is less than 25 microns. Also, a shaped article of sintered particulate ceramic material in which the mean maximum size of flaw is less than 25 microns and in which the minimum dimension of the shaped article is in excess of 0.1 mm.

7 Claims, No Drawings

ARTICLE OF CERAMIC MATERIAL AND PRODUCTION THEREOF

This is a continuation of application Ser No. 07/622,166, filed on Dec. 3, 1990, now abandoned, which is a continuation of Ser. No. 07/185,872, filed Apr. 25, 1988, now abandoned.

This invention relates to a shaped article made from a particulate ceramic material, and to a process for producing the article. It is to be understood that in this specification, by the term "particulate ceramic material", there is meant any solid inorganic particulate material the particles of which can be caused to sinter together by the application of heat.

It is of course very well known to produce shaped articles from particulate ceramic material by compacting the particles under high pressure in a dry state to form a shaped composition followed by heating of the thus shaped composition in order to sinter the particles. This known process suffers from the disadvantages that high pressures are required to produce the shaped composition, the volume fraction of the particulate ceramic material in the shaped composition is relatively low, generally no greater than 50% by volume, although in exceptional circumstances, e.g. where very high pressures are used, it may be as high as 60% by volume, and the articles which may be produced are generally of small size and of simple shape. The proportion of ceramic material in the shaped article may be increased, and the proportion of voids may correspondingly be decreased, by prolonged heating of the article, which serves to increase the density of the article. However, articles produced from particles of ceramic material by such a powder pressing process suffer from a further substantial disadvantage in that the strengths of the articles which are produced, both the flexural strength and the tensile strength, are not very high, and in particular they are not as high as may be desired. For example, although the theoretical tensile strength of alumina is of the order of 46 GPa shaped articles produced by pressing and sintering of particles of alumina rarely have tensile or flexural strengths in excess of 0.5 GPa. The cause of the very low strength of such shaped articles is believed to be the relatively large sized flaws in the articles, which may have dimensions of 50 microns or 100 microns or more, and which are a source of weakness in the articles. Such flaws may, for example, be pores which are formed during the compaction of the particulate ceramic material, or flaws associated with aggregates of particulate ceramic material, and which are present in the resultant shaped article.

Shaped articles of ceramic materials may be produced which have strengths substantially higher than those of articles produced by pressing and sintering particles of ceramic material. For example, it is known to produce silica fibres by drawing fibres from a melt. Such fibres may have tensile strengths of about 5 GPa and exhibit no flaws having a maximum size above 0.03 microns (Conference on Optical Fibres in Adverse Environments, Photon 83. May 16–19, 1983, Paris). Fibres and coatings of a ceramic material having tensile strengths in excess of 1 to 2 GPa may also be produced by chemical vapour deposition (CVD Fibres, Metal and Ceramic Matrix Composite Processing Conference, Columbus, Ohio, 1984) and by sol-gel processing (J. Am. Ceramic Soc. 67 (1984) 432–437). Although the fibres and coatings produced by the aforementioned processes may have flaws of only very small dimensions and be of relatively high tensile strength the fibres and coatings themselves have only very small dimensions, for example, a fibre thickness of about 10 microns and a coating thickness of about 10 microns. Furthermore, the production of fibres and coatings of ceramic materials by melt processing or by vapour deposition is very expensive.

Shapeable compositions of particulate ceramic materials are also known which comprise particulate ceramic material and a liquid medium. The liquid medium may be water, and such compositions may also contain a clay, or they may contain an organic polymer which is soluble in or at least dispersible in water. The presence of the clay, or of the organic polymer, aids in the production of a coherent composition which is readily shaped. The composition should be sufficiently fluid that it may be shaped, e.g. by casting into a mould, or by injection moulding, or by extrusion, and it may be shaped by application of a relatively low pressure. A shaped composition is first produced, and thereafter the liquid medium is removed from the composition, the polymer if present is burned out, and the particles of ceramic material are sintered in order to produce the shaped article. Such compositions and methods of production are of course well known in the art. However, the strengths, both tensile and flexural, of shaped articles produced from such compositions may not be as great as may be desired.

It is also known to produce shaped articles from compositions containing particulate ceramic material and a polymeric material as a binder for the particulate ceramic material. Such compositions may be shaped at elevated temperature, e.g. by injection moulding or by extrusion, at a temperature at which the polymeric material is fluid, and the polymeric material in the resultant shaped composition may be burned out and the particles of ceramic material which remain may be sintered. In order to shape such compositions an elevated temperature must be used at which the polymeric material is fluid, and prior to sintering of the particles of ceramic material it is necessary to remove the polymeric material from the shaped compositions e.g. by burning. The polymeric material may comprise a substantial proportion of the volume of the shaped composition and the burning out of the polymeric material may leave a substantial proportion of voids in the shaped article, with the result that the strength of the shaped article may not be as great as may be desired.

Examples of the production of shaped articles from a composition comprising particulate ceramic material and polymeric material include the following.

Japanese patent publication No. 55-115436-A describes injection moulding or extruding a composition of a ceramic or metal powder and a resin of polystyrene, atactic polypropylene or polyethylene, a lubricant, and a plasticiser.

Japanese patent publication No. 55-113510-A describes injection moulding or extruding a composition of ceramic or metal powder and a polyalkene resin cross-linked with a silane.

Japanese patent publication No. 76-029170-B describes an injection mouldable composition comprising a ceramic material such as alumina or zirconia and atactic polypropylene, wax, and a plasticiser such as ethyl phthalate or butyl phthalate.

GB patent No. 1 426 317 describes a composition which may be moulded and which comprises ceramic material and atactic polypropylene as binder. The composition may comprise an additional thermoplastic resin, a plasticiser, and/or a lubricating agent. The organic matter may be decomposed and volatilised by heating the shaped article at 340° to 380° C. and the final firing to sinter the ceramic material may be effected at 600° to 1650° C.

In recent years there has been considerable interest shown in the production of so-called high technology ceramics, also known as high performance ceramics, technical ceramics and structural ceramics. High technology ceramics have good mechanical properties under stress, good electrical properties, and resistance to high temperatures and to corrosive environments. Such high technology ceramics are finding uses in many different applications, for example in automotive applications, in heat exchanger applications, and as nozzles for burners. The good electrical properties of high-technology ceramics enable them to be used in capacitors, in piezoelectric devices, and as substrates for integrated circuits.

High technology ceramics may be produced from particulate ceramic materials by a refinement of the powder compaction process in which particulate ceramic material is compacted under high pressure and the thus compacted material is heated in order to sinter the ceramic particles. Particulate ceramic materials of uniform particle size are selected, and the materials may also be selected so as to be of small size, for example, a size below 0.5 micron. By use of a compaction and sintering process it is possible to produce from such selected particulate ceramic materials a shaped article which contains very little void space, and which may have a density of up to virtually 100% of the theoretical maximum. However, such a process suffers from the disadvantage that it is only possible to produce shaped articles of relatively small size and of relatively simple shape, and furthermore the strengths of the products still leave much to be desired. Such a process is described in Journal of the American Ceramic Society, Vol 67, No 3, pages 199 to 203. 1984.

A modification of a process for the production of a shaped article of a ceramic material from a composition comprising a particulate ceramic material and a liquid medium is described in European Patent Application No 85 308 352.5 (Publication No. 0 183 453). In this publication there is described a homogenous composition comprising at least one particulate ceramic material and a liquid medium which comprises at least 50% by volume of particulate ceramic material, in which the particulate ceramic material and liquid medium, which may be a solution of an organic polymeric material, are selected such that a test composition has a friction coefficient of less than 0.2, and in which the particulate ceramic material has a mean aspect ratio of less than 1.70. Also described is a process for production of a shaped article from the composition by shaping the composition, removing the liquid medium, and sintering the particles of ceramic material. Selection of the friction coefficient of the composition and of the mean aspect ratio of the particles of ceramic material makes it possible to produce high strength shaped articles from particulate ceramic material, for example, shaped articles of ceramic material having flexural strengths of the order of 300 to 400 MPa, or even approaching 500 MPa, depending in part on the nature of the ceramic material.

We have now found, however, that shaped articles may be produced from particulate ceramic materials which have even greater flexural strengths, in particular flexural strengths in excess of 450 MPa, or even in excess of 600 MPa, and even near to or greater than 1000 MPa. Furthermore, the high strength shaped articles produced in the process of the invention have dimensions substantially in excess of the dimensions of the high strength fibres and coatings produced hitherto, for example by drawing from a melt or by vapour deposition, in particular minimum dimensions which are generally in excess of 0.1 mm, or even in excess of 0.5 mm.

According to the present invention there is provided a process for the production of a shaped article of a ceramic material in which a composition comprising a particulate ceramic material and a liquid medium is shaped, the liquid medium is removed from the shaped composition, and the composition is heated to sinter the particles of ceramic material, in which the composition is subjected to high shear mixing such that in the shaped article which is produced the mean maximum size of flaw is less than 25 microns.

The flaws which are referred to are detectable in a sample of the shaped article by microscopic examination of a polished surface of the shaped article. The microscopic examination may be a visual examination or an examination by electron microscopy. The size of the flaw which is referred to is the maximum dimension in a straight line between two points of the flaw. Microscopic examination of a polished surface of a sample of the shaped article is effected, and the surface is repolished to reveal another surface which is itself subjected to microscopic examination. The polishing and examination procedure may be repeated a number of times. The, flaws in the shaped article may be holes or pores which have been included in the shaped composition during mixing of the composition or during the removal of the liquid medium from the shaped composition, or they may be edge flaws associated with aggregates of particulate ceramic material, and it is believed, without prejudice, that removal of, or decreasing the size of these flaws, particularly if the flaws are associated with aggregates of particulate ceramic material, is of substantial importance where high strength shaped articles are to be produced from particulate ceramic materials.

The mean maximum size of flaw referred to is that determined by microscopic examination of twenty separate areas of dimensions 1 mm $\times$ 1 mm on a polished surface of a sample of the shaped article, determining the maximum size of flaw in each of these separate areas, and calculating the mean maximum size of flaw, or where the dimensions of the shaped article necessitate examination of an area of smaller dimensions, that determined by microscopic examination of an equivalent number of separate areas having a surface area other than 1 mm$^2$, eg eighty separate areas of dimension 0.5 mm $\times$ 0.5 mm, and calculating the mean maximum size of the twenty largest flaws observed in the areas examined.

In a further embodiment of the invention there is provided a shaped article of sintered particulate ceramic material in which the mean maximum size of flaw is less than 25 microns and in which the minimum dimension of the shaped article is in excess of 0.1 mm.

Provided the mean maximum size of flaw in the shaped article of the sintered ceramic material is less than 25 microns it is found that the shaped article is of high strength, and specifically that is has a strength greater than that of a shaped article in which the mean maximum size of flaw is substantially greater than 25 microns. Indeed, it has been found to be possible to produce shaped articles of sintered ceramic material (for example, alumina) which have flexural strengths of 600 to 1000 MPa or even more. The production of such high strength shaped articles of ceramic material is associated with the use of high shear mixing of the composition from which the shaped article is produced, and in particular with the intensity of the high shear which is imparted to the composition during the mixing, as will be described hereinafter.

The flexural strength referred to is that determined in a 3-point bend test using a span of 16 mm and a cross-sectional area of 1 mm$^2$.

For particularly high strength shaped articles of sintered ceramic material it is preferred that the mean maximum size of flaw is less than 20 microns, more preferably less than 10 microns. It is also preferred, for particularly high strength in the shaped article of sintered ceramic material, that the maximum size of flaw be not greater than 30 microns, more preferably not greater than 20 microns.

The particulate ceramic material in the composition may be any inorganic particulate material provided the particles of the material can be caused to sinter by application of heat.

Thus, the particulate ceramic material may be an oxide or a mixture of oxides of a metallic or of a non-metallic element, for example, an oxide of aluminium, calcium, magnesium, silicon, chromium, hafnium, molybdenum, thorium, uranium, titanium, copper, yttrium, barium, lanthanum, strontium or zirconium. The ceramic material may be a carbide of one or more metallic or non-metallic elements, for example, a carbide of chromium, hafnium, molybdenum, niobium, tantalum, thorium, titanium, tungsten, uranium, zirconium or vanadium, or a nitride boride or silicide, of one or more of these elements. The ceramic material may be silicon carbide.

Within the scope of the term particulate ceramic material there are also included those metals which when in a powdered form can be sintered or fused together by application of heat, that is those metals which are susceptible of processing by the technique of powder metallurgy. Suitable such metals include aluminium and its alloys, copper and its alloys, and nickel and its alloys.

The particulate ceramic material may be a mixture of particles, for example. comprising a mixture of a particulate metal or metals and/or a particulate ceramic non-metallic material or materials.

It is preferred that the particles of ceramic material are of relatively small size, for example of a size less than 5 microns. Particles having a size of less than 1 micron, and even less than 0.2 micron, are more preferred as the use of such particles enables sintering of the particles of ceramic material to be effected at lower temperatures and at faster rates than would otherwise be the case.

The liquid medium is preferably liquid at ambient temperature, that is about 20° C., as it will then generally be possible to shape the composition at ambient temperature and avoid the necessity of using elevated temperatures, which are of course required where the composition comprises a particulate ceramic material and a polymeric material as binder, such as the polyethylene and atactic polypropylene as hereinbefore described.

The liquid medium may be an aqueous medium or a non-aqueous medium, but for reasons of expense and of safety, e.g. non-flammability, it is preferred that it be an aqueous medium.

The liquid medium preferably comprises an organic polymeric material in solution or dispersion in a liquid. The organic polymeric material acts as an aid to mixing of the components of the composition and as an aid to retention of shape in the shaped article produced from the mouldable composition, and it is preferred that the organic polymeric material be a water-soluble or water-dispersible material.

The particulate ceramic material will generally be present in the composition in a proportion of at least 50% by volume by which we mean at least 50% by volume of the whole composition including any air which may be present. It is preferred that the proportion of particulate ceramic material in the composition be as high as possible, whilst still retaining shapeability in the composition, as the possibility of producing a product from the composition which has a high density and which approaches or even attains the theoretical density of the particulate ceramic material is thereby improved. It is possible for the composition to comprise more than 60%, and even more than 70%, of particulate ceramic material by volume of the composition and for the composition to remain shapeable.

Suitable water-soluble polymeric materials include, for example, cellulose derivatives, e.g. hydroxy propyl methyl cellulose; polyacrylamide; polyethylene oxide; and a polyvinyl pyrollidone. A preferred polymeric material, which is particularly suitable for use in production of mouldable compositions, is a hydrolysed polymer or copolymer of a vinyl ester, particularly a hydrolysed polymer or copolymer of vinyl acetate. The degree of hydrolysis of the polymer or copolymer of vinyl acetate is preferably at least 50%, more preferably in the range 70% to 90%, particularly where the composition is to be processed at or near ambient temperature.

Where the liquid medium comprises a solution or dispersion of an organic polymeric material in a liquid the concentration of the organic polymeric material will depend on a number of factors, for example, the nature of the organic polymeric material, the nature of the particulate ceramic material, for example, its mean aspect ratio, and on the relative proportions by volume of the particulate ceramic material and of the liquid medium. A concentration of organic polymeric material in the liquid medium in the range 5% to 60% by volume will generally suffice.

The components of the composition must be subjected to mixing under conditions of high shear if a high strength shaped article is to be produced in which the flaws which may be present have a mean maximum size of less than 25 microns. In European Patent Application No 85 308 352.5 (Publication No 0 183 453) there is described high shear mixing of the components of a composition which comprises particulate ceramic material and a liquid medium, which liquid medium may he a solution or a dispersion of an organic polymeric material. In this publication the types of high shear mixing which are described include mixing in a screw extruder, and mixing on a twin-roll mill the rolls of which may be operated at the same or at different peripheral speeds, the mixing being effected by passing the composition repeatedly through the nip between the rolls of the mill, which nip may be progressively decreased in size. The nip between the rolls of the mill may be decreased to a size as low as 0.1 mm with the result that high shear may be applied to the composition which assists in breaking down aggregates of particulate ceramic material which may be present in the composition. However, it has been found that high shear mixing as described and exemplified in this European Patent Publication is not of sufficiently high intensity as to result in production of a shaped article of sintered particulate ceramic material having a mean maximum size of flaw which is less than 25 microns. A particularly high intensity high shear mixing is required in order that such a shaped article may be produced and it has been found that such mixing may be achieved, for example, by extruding the composition through a narrow orifice. e.g. a die of diameter less than 3 mm, and preferably a die of diameter of less than 1 mm. The length of the die has an effect on the intensity of mixing of the components of the composition and a die length of at least 1 mm is preferred. A die length of at least 5 mm is more preferred. It is believed that extrusion of the composition through such an orifice may result in substantial breakdown of aggregates of particulate ceramic material, and thus a substantial reduction in the sizes of flaws associated with such aggregates in the sintered shaped article.

Extrusion of the composition through such an orifice is particularly suitable for use in the production shaped articles in the form of high strength wires, filaments and fibres of sintered particulate ceramic material. Where a shaped article of more massive dimensions is desired the composition may be extruded through a plurality of such orifices and the extrudates may be combined and converted into the desired shape, e.g. by plastics or rubber processing techniques, for example, by compression in a mould, by extrusion, by injection moulding, and/or by calendering on a twin-roll mill to form a sheet.

The shaped composition may be further processed to remove the liquid medium, or the volatile components of the liquid medium, from the shaped composition. This further processing, referred to as drying, may be accompanied by shrinkage of the shaped composition. Drying may be effected in an oven, e.g. at a temperature of up to 100° C. or somewhat higher, particularly when the liquid in the liquid medium is water.

Where the liquid medium in the composition comprises an organic polymeric material this material is removed from the shaped composition prior to sintering of the particles of ceramic material. The organic polymeric material may be removed by burning. Burning of the organic polymeric material may be effected by progressively increasing the temperature of the dried shaped composition. The temperature should not be increased at a rate which results in such a rapid burn-out of the organic polymeric material that the structural integrity of the shaped article is disturbed.

The temperature to which the shaped composition must be heated in order to remove the organic polymeric material will depend on the nature of the latter material, but a temperature of not greater than 500° C. will generally suffice.

The particles of ceramic material in the shaped composition, after removal of the organic polymeric material from the composition, may be sintered by heating the composition at high temperature, optionally with the application of pressure. The temperature at which sintering of the particles of ceramic material will be effected will depend on the nature of the ceramic material. This temperature will generally be above 500° C., and may be above 1500° C., or even above 2000° C.

In order that the composition which is used in the process of the invention may be particularly readily processable, and in particular in order that it may be shapeable by high intensity high shear mixing, and in order that it may contain a high proportion of particulate ceramic material whilst remaining processable, it is preferred that the particulate ceramic material and the liquid medium of the composition are selected such that the composition has a friction coefficient as herein defined of less than 0.2, and that the particulate ceramic material is selected to have a mean aspect ratio of less than 1.70, as described herein.

The friction coefficient of the composition is determined according to the following test. A composition comprising ceramic material and a liquid medium and containing the desired proportion by volume of particulate ceramic material is thoroughly mixed and the particles of ceramic material are dispersed, e.g. by application of high shear, and the composition is placed on a flat surface, the height of the composition above the surface being at least 18 mm. Thereafter, a cylindrical ram of diameter 13 mm is applied to the composition, with the whole of the surface of the end of the ram in contact with the composition, and the load on the ram is increased to 5000 Newtons at which load the thickness "t" of the composition between the ram and the flat surface is determined. The friction coefficient is defined as $\mu$, where $$\mu = \frac{4}{3 + 13/t}$$

The test is carried out over a range of ram speeds between 1 mm/min and 100 mm/min, within which range there must be at least one ram speed at which the friction coefficient is less than 0.2.

The friction coefficient test may be effected at ambient temperature. Alternatively, it may be effected at elevated temperature in order that the composition may satisfy the requirements of the test.

The aspect ratio of the particles of ceramic material is determined by examination of the particles in a dispersion in a liquid medium which may be for example an alcohol, but which is preferably a solution of an organic polymeric material in a liquid medium. Dispersion, and particularly the breakdown of aggregates of particles, may be assisted by shearing the dispersion and/or by subjecting the dispersion to ultrasonic vibration. A sample of the dispersion is examined by microscopy at several magnifications, the maximum dimension and the minimum dimension of at least 100 of the dispersed particles are determined, the aspect ratio for each particle thus examined is calculated, that is the ratio of the maximum dimension to the minimum dimension, and the mean aspect ratio of the particles in the sample examined is determined.

The invention is illustrated by the following Examples.

EXAMPLE 1

100 parts by weight of particulate $TiO_2$ (RSM2 Tioxide Ltd), having a mean size of 0.23 micron, and 10 parts by weight of 80% hydrolysed polyvinylacetate (Gohsenol KH 17S, Nippon Goshei) were charged to an orbital action mixer and blended in the mixer for 1 minute. 14 parts by weight of water were then charged to the mixer and blending was continued for a further 30 seconds. The resultant mixture in the form of a crumbly mass was removed from the orbital action mixer and charged to a twin-roll mill and blended thereon by passing the composition repeatedly through the nip between the rolls of the mill which were rotating at different peripheral speeds. The nip between the rolls was progressively narrowed and the composition was subjected to a high shearing action.

The homogenously mixed composition was removed from the mill in the form of a sheet and the sheet was divided into two equal sized parts.

The first part of the sheet was charged to a ram extruder fitted with a 13 mm diameter ram and a die having a diameter of 1 mm and a length of 2 mm and the mixture was extruded through the die at an extrusion pressure of 38 MPa and a rate of travel of the ram of 10 mm/minute. The extrudate was cut into rods of length 130 mm which were heated at a temperature of 80° C. until the water had been removed from the rods. Thereafter, the rods were heated in a furnace to a temperature of 450° C. at a rate of heating of 1° C. per minute in order to burn off the hydrolysed polyvinyl acetate from the rods, and the rods were then heated at 1200° C. for 1 hour in order to sinter the particles of $TiO_2$.

The flexural strength of the resultant rods, measured in a 3-point bend test, was 470±40 MPa, and the rods had a Weibull modulus of 12.

The surface of a part of the rods was ground with abrasive paper, and polished to a fine finish by means of a diamond paste, and the polished surface was examined at a magnification of ×100 by optical microscopy. The flaws were visible as dark regions on the polished surface of the rods. The mean maximum flaw size was 9 microns. The maximum flaw size which was observed was 17 microns and the percentages by number of flaws within various size ranges from 4 to 6 microns up to 16 to 18 microns were as follows:

| Percentage | Size Microns |
| --- | --- |
| 74 | 4 to 6 |
| 12 | 6 to 8 |
| 4 | 8 to 10 |
| 4 | 10 to 12 |
| 2 | 12 to 14 |
| 2 | 14 to 16 |
| 2 | 16 to 18 |

By way of comparison the second part of the sheet which had been removed from the twin-roll mill was dried, heated to remove the hydrolysed polyvinyl acetate, heated to sinter the particles of $TiO_2$, and microscopically examined, following the above-described procedure.

The mean maximum flaw size was 28 microns, the maximum flaw size observed was 63 microns, and the percentages by number of flaws within various size ranges from 20 to 30 microns up to 70 microns were as follows:

| Percentage | Size Microns |
| --- | --- |
| 20 to 30 | 65 |
| 30 to 40 | 20 |
| 40 to 50 | 5 |
| 50 to 60 | 5 |
| 60 to 70 | 5 |

The flexural strength of the material was 222±25 MPa and the Weibull modulus was 8.1.

EXAMPLE 2

The procedure of Example 1 was repeated except that the $TiO_2$ was replaced by particulate $Al_2O_3$ (HPDBM-Reynolds) having a mean size of 0.3 micron, a part of the sheet removed from the twin-roll mill was extruded through a 2 mm diameter die at a ram speed of 20 mm/minute and a pressure of 6MPa, and the particles of $Al_2O_3$ were sintered by heating at a temperature of 1550° C.. for 1 hour.

The flexural strength of the rods was 601±32 MPa and the Weibull modulus was 13.

The mean maximum flow was 24 microns, the maximum flaw size observed was 32 microns and the percentages by number of flows in various size ranges from 5 to 10 microns up to 30 to 35 microns were as follows:

| Percentage | Size Microns |
| --- | --- |
| 86 | 5 to 10 |
| 7 | 10 to 15 |
| 5 | 15 to 20 |
| 1 | 20 to 25 |
| 0 | 25 to 30 |
| 1 | 30 to 35 |

By way of comparison the second of part of the sheet which had been removed from the twin-roll mill was dried, heated to remove the hydrolysed polyvinyl acetate, heated to sinter the particles of $Al_2O_3$, and microscopically examined following the above-described procedure. The mean maximum flaw size which was observed was 83 microns, the maximum flaw size observed was 118 microns and the percentage by number of flaws within various size ranges from 40 to 60 microns up to 100 to 120 microns were as follows:

| Percentage | Size Microns |
| --- | --- |
| 51 | 40 to 60 |
| 26 | 60 to 80 |
| 15 | 80 to 100 |
| 8 | 100 to 120 |

The flexural strength of the material was 324±40 MPa and the Weibull modulus was 9.5

EXAMPLE 3

The procedure of Example 2 was repeated except that the particulate $Al_2O_3$ was (AKP30 supplied by Sumitomo). a part of the sheet removed from the twin-roll mill was extruded through a 1 mm diameter die, and the particles of $Al_2O_3$ were sintered by heating at 1500° C. for 1 hour.

The flexural strength of the rods was 1042 MPa, the mean maximum flaw size was 22 microns, the maximum flaw size observed was 28 microns, and the Weibull modulus was 12.

By way of comparison the flexural strength of the sheet of sintered particulate $Al_2O_3$ was 366 MPa, the mean maximum flaw size was 40 microns, the maximum flaw size observed was 80 microns, and the Weibull modulus was 10.

By way of further comparison the flexural strengths, mean maximum flaw sizes, and maximum observed flaw sizes of number of commercially available products of sintered particulate ceramic materials were determined as follows.

| Product | Mean maximum flaw size microns | Maximum flaw size microns | Flexural Strength MPa |
| --- | --- | --- | --- |
| 3.5 mm diameter rod-$Al_2O_3$ (Coors) | 35 | 107 | 550 |
| 1.5 mm diameter rod-$Al_2O_3$ (Coors) | 28 | 45 | 626 |
| 0.6 mm thick sheet-$Al_2O_3$ (Coors) | 42 | 63 | 371 |
| 0.6 m thick shet-$Al_2O_3$ (NTK) | 32 | 49 | 626 |

EXAMPLE 4

The procedure of Example 2 was repeated except that the particulate $Al_2O_3$ was first dispersed in ethanol, agitated ultrasonically, the filtered through a 10 microns sieve, and freeze dried.

The flexural strength of the rods was 1046±1050 MPa and the Weibull modulus was 5, the mean maximum flaw size was 13 microns and the maximum flaw size observed was 61 microns.

By way of comparison the second part of the sheet was dried, heated to remove hydrolysed polyvinyl acetate, and heated to sinter the particles of $Al_2O_3$ following the procedure described in Example 2. The flexural strength of the sheet was 345 MPa, the Weibull modulus was 5, the mean maximum flaw size was 30 microns, and the maximum flaw size observed was 60 microns.

EXAMPLE 5

The procedure of Example 1 was repeated except that the particulate $TiO_2$ which was used was coated with 6% by weight of an aluminosilicate coating (RCR2 Tioxide Ltd), and the particles of $TiO_2$ were sintered by heating at 1150° C. for 1 hour.

The flexural strength of the rods was 750 MPa and the Weibull modulus was 9. The mean maximum flaw size was 14 microns and the maximum flaw size observed was 27 microns.

By way of comparison the particulate $TiO_2$ as used above was pressed in a die and heated to sinter the particles of $TiO_2$ following the above procedure, the flexural strength of the sample removed from the die was 191 MPa, the Weibull modulus was 9, the mean maximum flaw size was 51 microns, and the maximum flaw size observed was 124 microns.

By way of further comparison the second part of the sheet was dried, heated to remove hydrolysed polyvinyl acetate, and heated to sinter the particles of $TiO_2$ following the procedure described in Example 1. The flexural strength of the sheets was 220 MPa, the Weibull modulus was 8, the mean maximum flaw size was 31 microns, and the maximum flaw size observed was 80 microns.

EXAMPLE 6

99.5% pure particulate $TiO_2$ of particle size 0.2 micron was ball-milled in water to break down agglomerates of particles. The resultant suspension contained no particle of size greater than 1 micron when analysed with a Malvern Mastersizer Instrument. The particles in the suspension were allowed to settle to a particle packing volume fraction of 0.55, the supernatant liquid was removed, glycerol and an aqueous solution of hydrolysed polyvinyl acetate as used in Example 1 were mixed with the particles to form a composition, in parts by weight, of $TiO_2$ 100/hydrolysed polyvinyl acetate 10/glycerol 5/water 7. Thereafter the procedure of Example 1 was followed except that a temperature of 1150° C. was used in place of the sintering temperature of 1200° C.

The flexural strength of the rods was 550 MPa and the Weibull modulus was 6. After further heating at 1150° C. for 1 hour to densify the rods the flexural strength was 779 MPa and the Weibull modulus was 10.

The mean maximum flaw size in the densified rods was 17 microns and the maximum flaw size observed was 31 microns.

By way of comparison the second part of the sheet was dried, heated to remove hydrolysed polyvinyl acetate, and heated to sinter the particles of $TiO_2$ following the procedure described in Example 1. The flexural strength o the sheet was 353 MPa, the Weibull modulus was 8, the mean maximum flaw size was 26 microns, and the maximum flaw size observed was 42 microns.

EXAMPLE 7

In four separate experiments the procedure of Example 5 was repeated except that in addition to extruding the sheet from a ram extruder through a 1 mm diameter orifice the sheet was extruded through 2 mm, 3 mm and 4 mm diameter orifices. The properties of the rods which were produced are shown in the following table.

| Experiment | Die Diameter mm | Mean Maximum Flaw Size microns | Maximum Flaw Size microns | Flexural Strength MPa |
| --- | --- | --- | --- | --- |
| 1 | 1 | 14 | 27 | 670 ± 30 |
| 2 | 2 | 11 | 25 | 452 ± 114 |
| 3 | 3 | 25 | 55 | 278 ± 57 |
| 4 | 4 | 31 | 80 | 207 ± 52 |

As the mean maximum flaw size of the flaws in the rods of experiments 3 and 4 are 25 microns or greater these experiments are by way of comparison. The experiments demonstrate that the smaller is the diameter of the die through which the composition from which the rod is produced is extruded the smaller is the mean maximum size of the flaws in the rod and the greater is the flexural strength of the rod.

EXAMPLE 8

A mixture of lanthanum oxide and copper oxide was ball-milled in ethanol, separated from the ethanol, and calcined at 900° C. for 8 hours, and the resultant powder was vibro-milled in tertiary butyl alcohol and then freeze dried. The powder had a composition as shown by x-ray analysis of $La_2CuO_4$. 120 parts by weight of the powder were mixed with 7 parts by weight of polyvinylbutyral (Pioloform E518) and 12 parts by weight of cyclohexane and the mixture was milled on a twin roll mill, the resultant sheet was divided into two equal parts, one of the parts were extruded from a ram extruder through a 1 mm diameter die, and the rod was heated following the procedure of example 1, except that a maximum temperature of 1000° C. was reached.

The flexural strength of the rods was 412 MPa and the Weibull modulus was 10. The mean maximum flaw size was 21 microns and the maximum flaw size observed was 44 microns.

By way of comparison the second part of the sheet was dried and heated following the procedure described above. The flexural strength of the sheets was 250 MPa, the Weibull modulus was 11, the mean maximum flaw size was 27 microns, and the maximum flaw size observed was 200 microns.

EXAMPLE 9

The procedure of Example 8 was repeated except that the powder had a composition $Y Ba_2 Cu_3 O_7$ and had been produced by calcining a mixture of yttrium oxide, barium carbonate and copper oxide.

The flexural strength of the rods was 216 MPa and the Weibull modulus was 11.

The mean maximum flaw size was 20 microns and the maximum flaw size observed was 40 microns.

By way of comparison the second part of the sheet was dried and heated following the procedure described in Example 8. The flexural strength of the sheet was 62 MPa, the Weibull modulus was 10, the mean maximum flaw size was 30 microns, and the maximum flaw size observed was 60 microns.

EXAMPLE 10

The procedure of Example 1 was repeated except that silica powder (Aerosil, Degussa) was used in place of the $TiO_2$, 20 parts by weight of hydrolysed polyvinyl acetate and 26 parts by weight of water were used, and the final temperature reached in the heating was 1040° C. for 4 hours.

The flexural strength of the rods was 238 MPa and the Weibull modulus was 6.

The mean maximum flaw size was 11 microns and the maximum flaw size observed was 21 microns.

By way of comparison the second part of the sheet was dried, heated to remove hydrolysed polyvinyl acetate, and heated to sinter the particles of $SiO_2$ following the procedure described above. The flexural strength of the sheets was 62 MPa, the Wellbull modulus was 3, the mean maximum flaw size was 43 microns, and the maximum flaw size observed was 60 microns.

EXAMPLE 11

The procedure of Example 1 was repeated except that 120 parts by weight of yttria stabilised zirconia powder (H5Y3 Daichi Kigenso) was used in place of the $TiO_2$, 8 parts by weight of hydrolysed polyvinyl acetate and 9 parts by weight of water were used. The sheet removed from the twin-roll mill was extruded through a die to diameter 2 mm and the final temperature reached in the heating was 1500° C. for 1 hour.

The flexural strength of the rod was 878 MPa, the mean maximum flaw size was 8 microns, and the maximum flaw size observed was 14 microns.

We claim:

1. In a process for the production of a shaped and sintered article of a ceramic material in which a composition comprising a particulate ceramic material and a liquid medium is shaped, the liquid medium is removed from the shaped composition, and the shaped composition is heated to sinter the particles of ceramic material, the improvement in which the composition is subjected to high shear mixing and is then shaped by extrusion through a die of diameter less than 3 mm such that the composition undergoes further high intensity high shear mixing during extrusion and the shaped article has a minimum dimension in excess of 0.1 mm wherein the sintered article produced subsequent to extrusion has a mean maximum size of flaw produced therein of less than 25 microns and a flexural strength in excess of 450 MPa.

2. A process as claimed in claim 1 in which the liquid medium is an aqueous medium.

3. A process as claimed in claim 2 in which the aqueous medium comprises a solution or dispersion of an organic polymeric material.

4. A process as claimed in claim 1 in which the composition comprises more than 60% by volume of particulate ceramic material.

5. A process as claimed in claim 1 in which the mean maximum size of flaw in the sintered article is less than 20 microns.

6. A process as claimed in claim 1 in which the maximum size of flaw in the sintered article is not greater than 30 microns.

7. The process of claim 1, wherein the extrusion die length is at least 5 mm.

* * * * *